J. H. McCABE & W. C. BERRY.
VEHICLE BODY.
APPLICATION FILED APR. 3, 1915.
1,173,144.
Patented Feb. 22, 1916.
2 SHEETS—SHEET 1.
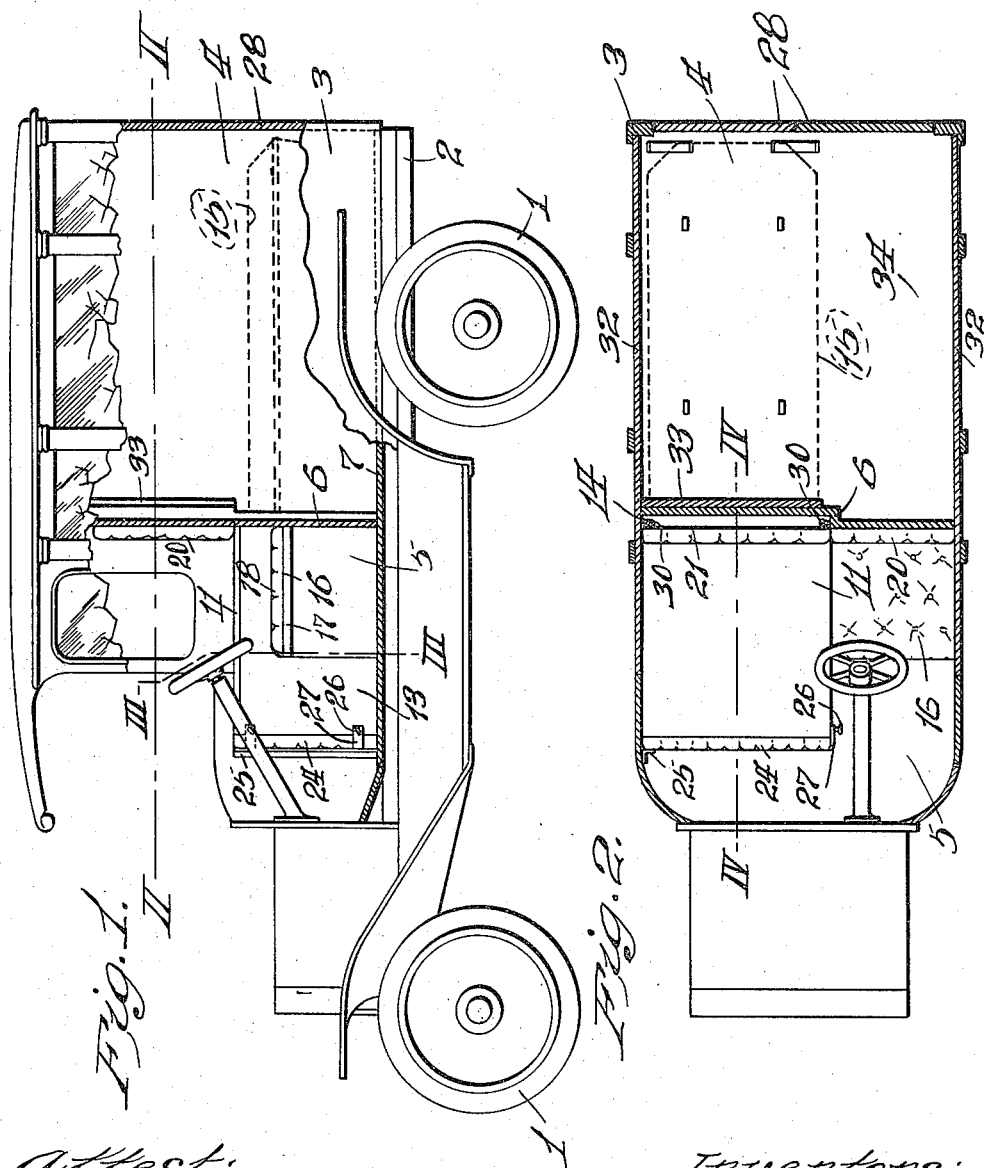

J. H. McCABE & W. C. BERRY.
VEHICLE BODY.
APPLICATION FILED APR. 3, 1915.
1,173,144.
Patented Feb. 22, 1916.
2 SHEETS—SHEET 2.
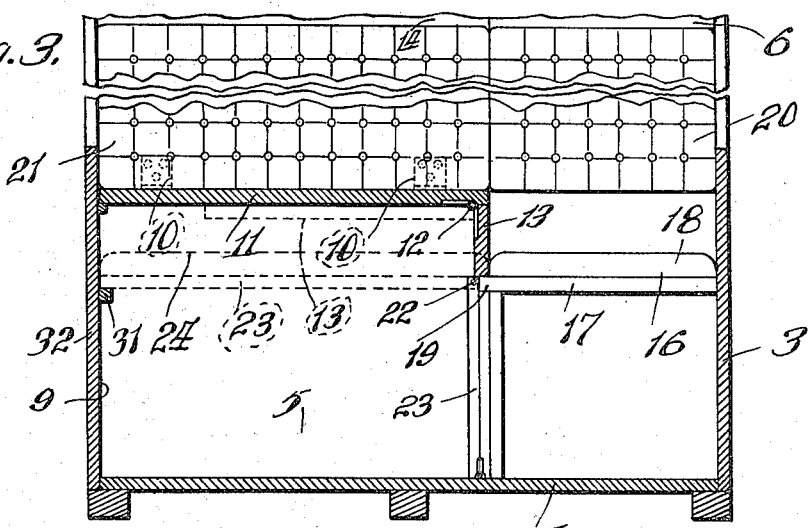
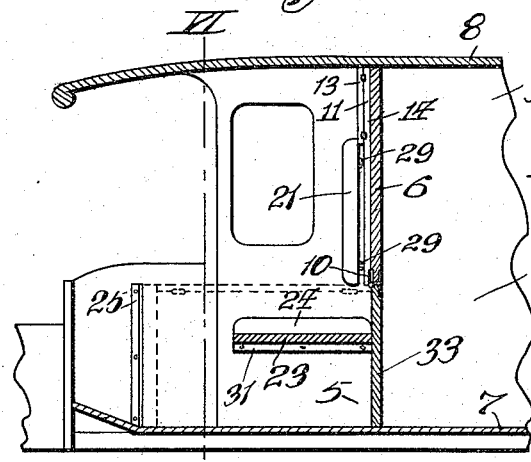
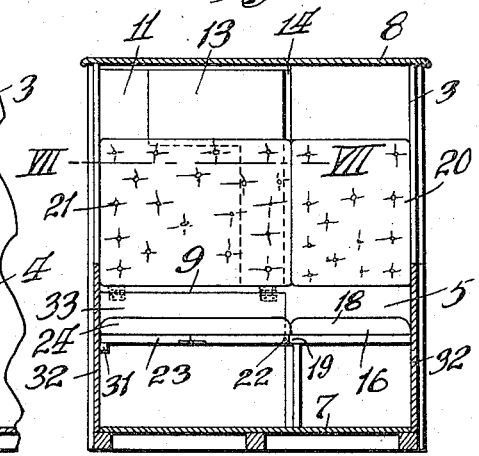
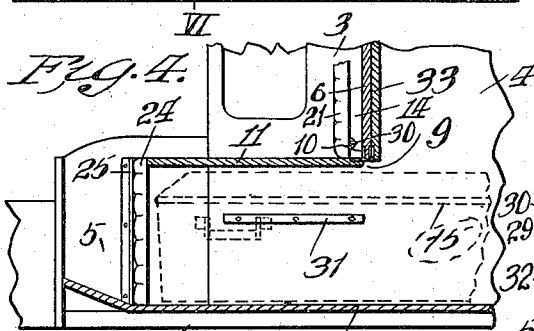
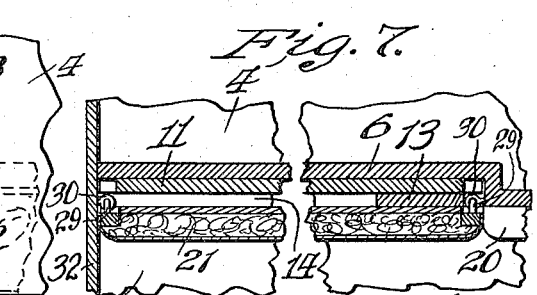
Inventors:
James H. McCabe.
William C. Berry.
By Knight Bros.
Attys.

UNITED STATES PATENT OFFICE.

JAMES H. McCABE AND WILLIAM C. BERRY, OF ST. LOUIS, MISSOURI.

VEHICLE-BODY.

1,173,144.  Specification of Letters Patent.  Patented Feb. 22, 1916.

Application filed April 3, 1915. Serial No. 18,872.

*To all whom it may concern:*

Be it known that we, JAMES H. MCCABE and WILLIAM C. BERRY, citizens of the United States of America, and residents of the city of St. Louis and State of Missouri, have invented certain new and useful Improvements in Vehicle-Bodies, of which the following is a specification.

The primary object of this invention is to provide an improvement in closed vehicle bodies that are of short length so that said bodies can be used for hearses and the like, in which the front seat is made partly foldable, the object being to fold or knock-down the foldable seat portion so that a casket, or other relatively long object, can be conveyed, one end of the casket occupying the space in which the foldable seat was mounted.

Another object is to utilize the seat or foot room on one side of the driver, or chauffeur, so that objects that are relatively long can be conveyed in a short length vehicle body.

A further object is to provide a vehicle body with two compartments, one of said compartments containing knock-down portions in which said portions, when knocked down from their assembled positions, provide means for the introduction of one end of a relatively long object, said object being too long to be wholly contained in the other compartment.

Other and further objects will appear in the specification, and be specifically pointed out in the appended claims, reference being had to the accompanying drawings exemplifying the invention, and in which, Figure 1 is a side elevation of a vehicle body, a portion of the side of the body being broken away, parts thereof being shown in section. Fig. 2 is a horizontal section taken on the line II—II, Fig. 1. Fig. 3 is an enlarged transverse section taken on the line III—III, Fig. 1. Fig. 4 is a longitudinal fragmentary section taken on the line IV—IV, Fig. 2. Fig. 5 is a view, similar to Fig. 4, but showing the folding parts in a different position. Fig. 6 is a transverse section taken on the line VI—VI, Fig. 5. Fig. 7 is an enlarged horizontal section taken on the line VII—VII, Fig. 6.

Referring to the drawings: 1 designates the wheel of a vehicle, said wheels being for the support of the chassis 2. Mounted on said chassis is a vehicle body 3. The body 3 comprises a conveying compartment 4 and a driver's compartment 5, said compartments being divided by the partition 6, said partition extending from the bottom 7 to the top 8 of the vehicle. Formed in said partition 6, on one side thereof, and adjacent the bottom 7, is an opening 9, said opening communicating with the compartments 4 and 5. Hinged to said partition in the compartment 5, by hinges 10, is a cover 11. Swingingly mounted to one side of said cover by hinges 12 is a side wall 13. Formed in said partition 6 is a pocket 14, said pocket extending from the top of the opening 9 to the roof or top 8 of the vehicle body, and is the approximate width of said opening. This cover 11, when mounted in the position shown in Figs. 1, 2, 3 and 4, is adapted to form a closure for one end of a casket 15, when said casket is being conveyed in the compartment 4.

Located in the compartment 5 is a driver's seat 16, said seat comprising a support 17 and a cushion 18, said support having an extended portion 19. When the cover 11 is serving as a closure, a portion of the side wall 13 is adapted to rest on the portion 19 of the seat support 17, whereas the other portion of said side wall extends downwardly to the bottom 7 of the body.

Securely mounted to the partition 6, in the compartment 5, is a cushion lazyback 20. Removably mounted to said partition is a lazyback 21, said lazyback 21 being in vertical alinement with the lazyback 20. Secured to said extended portion 19, by the hinge 22, is a foldable seat support 23. Adapted to be mounted on said seat support 23 is a cushion 24.

When the cover 11 is being used as a closure for one end of the casket, the foldable seat support 23 is mounted in the position shown in Fig. 3, and the cushion 24 of said seat support is adapted to serve as an end wall to the closure or cover 11, said cushion being held in position at one end by a guiding member 25, whereas the opposite end of said cushion is held in position by thumb screws 26 which pass through brackets 27, said brackets being carried by the cushion 24, said thumb screws 26 engaging the side wall 13.

This improvement in vehicle bodies is applicable to vehicle bodies that are short in length, said bodies being so designed as to be mounted on the smaller type of automobile chassis, so that an inexpensive hearse, casket wagon, or ambulance can be provided. For this reason, the construction of this improved vehicle body has been so designed as to utilize the seat and foot room that is on one side of the driver. In the event of this improved body being used as a hearse, the casket is first introduced in the compartment 4 from the rear end, said rear end having the doors 28. Inasmuch as caskets are relatively long, the forward end of the casket is introduced into the utilized foot room, which is housed over by the cover or closure 11.

When this improved body is not being used as a casket conveyer, and it is necessary for the driver to have a companion, the seat cushion 24 is removed from its position of serving as an end wall to the closure 11. Then the seat wall 13 of said closure is swung upwardly against the under side of the cover 11. Then said cover 11 and side wall 13 are swung upwardly together on the hinges 10 into a vertical position in the pocket 14, the lazyback 21, of course, being first removed from its position against the partition 6. The lazyback 21 is then remounted in its former position against said partition, the hooks 29 thereof being secured in the eyes 30. This lazyback 21 will hold the parts 11 and 13, which form the closure, in their elevated folded position. The folding seat support 23 is then swung outwardly and upwardly, the outer end of said seat support adapted to be mounted on the ledge 31, which is mounted on one of the side walls 32 of the vehicle body. The cushion 24, which serves as an end wall to the closure 11, is then mounted on the seat support 23, said cushion being to harmonize with the driver's cushion 18. The removable lazyback 21 will also be in harmony with the driver's lazyback 20. The opening 9 of the partition 6 is then closed by the swingingly mounted closure door 33, which is mounted to said partition 6 in the compartment 4.

It is seen from the aforesaid description that a short length vehicle body can be so constructed as to be utilized in conveying objects that are relatively long, as well as means being provided for converting the forward part of the vehicle into a folding seat when the body is not being used as a conveyer of lengthy objects.

When this improved vehicle body is being used as a hearse, the space 34, which remains in the compartment 4 on one side of the casket, can be utilized for devices that are essential for funerals.

If desired, the cushion 24 of the seat support 23, which also serves as an end wall to the closure 11, can be used as a seat in lieu of said seat support 23, said cushion being supported by the extended portion 19 and the ledge 31.

What we claim is:

1. In a vehicle body, a foldable seat, and a foldable closure, said closure adapted to occupy the position of said seat when said seat is folded.

2. In a vehicle body, a removable seat, and a removable closure, said closure adapted to be moved into the seating position of said seat when said seat is removed.

3. A vehicle body comprising a pair of compartments, a partition dividing said compartments, a pocket formed in said partition, an opening formed in said partition, and a closure adapted to abut said partition adjacent said opening said closure adapted to be conveyed to a seating position in said pocket.

4. A vehicle body comprising a pair of compartments, a partition dividing said compartments, an opening formed in said partition, a removable closure adapted to aline with said opening, and a removable seat adapted to occupy the position of said closure when said closure is removed.

5. A vehicle body comprising a pair of compartments, a partition dividing said compartments, a pocket formed in said partition, an opening formed in said partition, and a foldable closure adapted to aline with said opening, said closure when folded adapted to be seated in said pocket.

6. A vehicle body comprising a pair of compartments, a partition dividing said compartments, a pocket formed in said partition, an opening formed in said partition, a foldable closure adapted to aline with said opening, said closure, when folded, adapted to be seated in said pocket, and a foldable seat adapted to occupy the former position of said closure.

7. A vehicle body comprising a pair of compartments, a partition dividing said compartments, a pocket formed in said partition, an opening formed in said partition, a foldable closure adapted to aline with said opening, said closure, when folded, adapted to be seated in said pocket, and a removable back rest adapted to hold said closure in its pocketed position.

8. A vehicle body comprising a pair of compartments, a partition dividing said compartments, an opening formed in said partition, a foldable closure adapted to aline with said opening, said closure adapted to be folded out of alining position with said opening, a seat having a portion thereof demountable, said demountable portion of said seat adapted to be mounted into seating position when said closure is folded out of its alining position with said opening.

9. A vehicle body comprising a pair of compartments, a partition dividing said compartments, an opening formed in said partition, a foldable closure adapted to aline with said opening, said closure adapted to be folded out of alining position with said opening, a seat having a portion thereof demountable, said demountable portion of said seat adapted to be mounted into seating position when said closure is folded out of its alining position with said opening, said demountable portion of said seat adapted to serve as an end wall to said closure, when said closure is in an alining position with said opening of said partition.

JAMES H. McCABE.
WILLIAM C. BERRY.

In the presence of—
H. G. FLETCHER,
M. C. HAMMON.

Copies of this patent may be obtained for five cents each, by addressing the "Commissioner of Patents, Washington, D. C."